Jan. 9, 1951  C. F. PRANGLEY  2,537,603
ELECTRICALLY CONTROLLED LIQUID DISPENSING APPARATUS
Filed Jan. 21, 1944
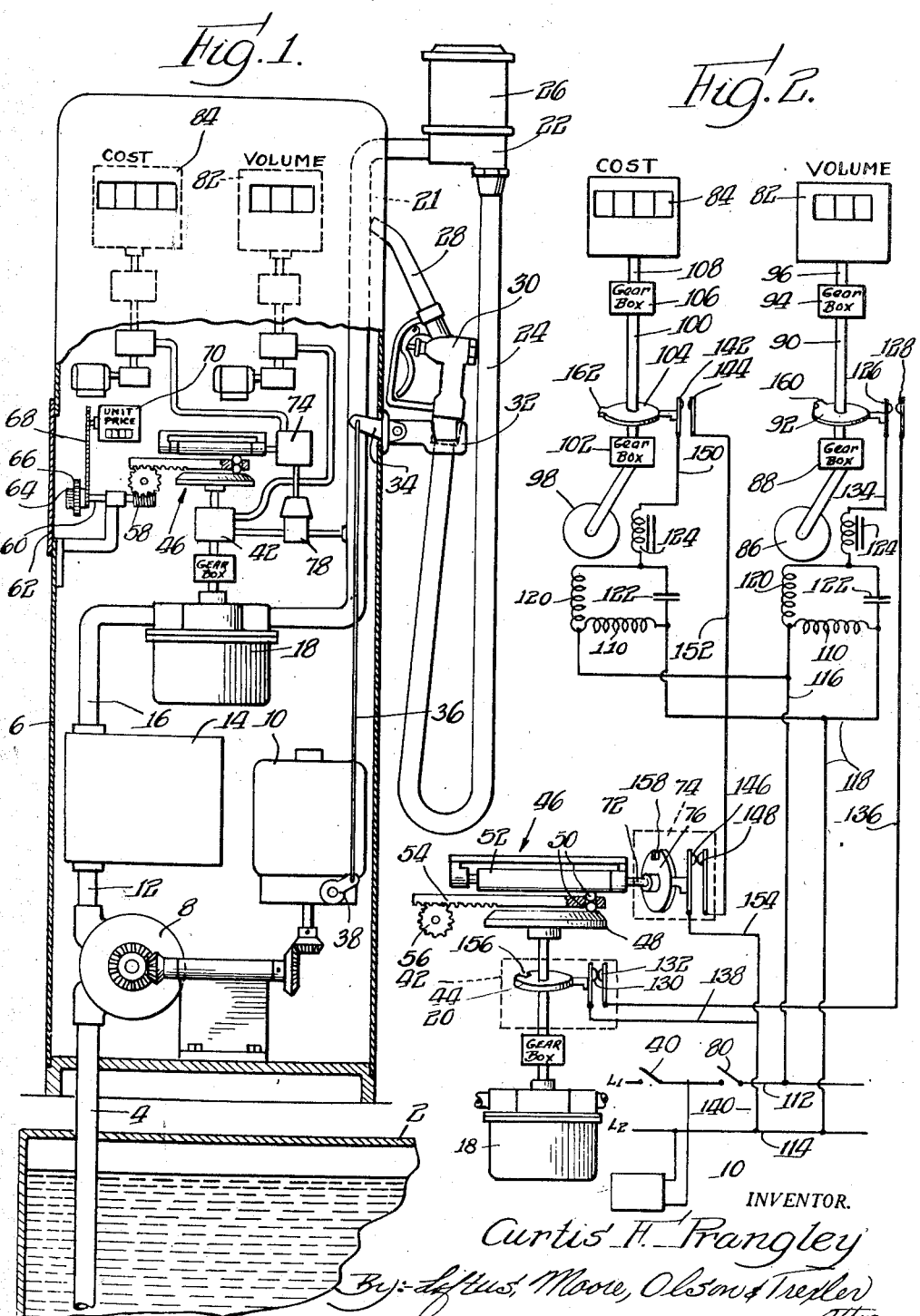
INVENTOR.
Curtis F. Prangley
By: Loftus, Moore, Olson & Trexler
attys.

Patented Jan. 9, 1951

2,537,603

UNITED STATES PATENT OFFICE 2,537,603

ELECTRICALLY CONTROLLED LIQUID DISPENSING APPARATUS

Curtis F. Prangley, Evanston, Ill.

Application January 21, 1944, Serial No. 519,183

9 Claims. (Cl. 222—76)

This invention relates to dispensing devices, and more particularly to devices for dispensing fuels for internal combustion engines and the like.

Among the objects of the present invention are to provide a liquid dispensing apparatus including electric motor driven integrating or computing means for indicating the volume and cost of the liquid dispensed; to provide a dispensing device of the computing pump type which is relatively simple in construction and inexpensive in cost and also efficient in operation; to provide a device of this type which may be easily adjusted to effect any necessary price change.

More particularly it is an object of the invention to provide electric motor means governed in operation by the meter to integrate or compute and indicate the volume and cost of the liquid dispensed.

A further object of the invention is to provide electric motor driven cost and volume computing means for indicating the volume and cost of the liquid dispensed and in which the operation of the motor driving the volume indicating mechanism is synchronized with the operations of the meter while the motor driving the volume register is maintained in synchronism with a mechanism having an adjustable speed relation to the operation of the meter and which relation may be varied in accordance with the price per unit of volume of liquid dispensed.

A further object of the invention is to provide a gasoline pump of the computer type wherein the computer may be operated without mechanical connection whatsoever to the liquid forcing and measuring elements of the pump and which computer may, therefore, be located in any desired location either remote from or adjacent to said elements.

Other and further objects of the invention will be apparent from the following specification when taken in connection with the accompanying drawings, wherein:

Figure 1 is a view in side elevation of a computer pump embodying the invention.

Figure 2 is a schematic diagram of the electric circuit and controls by means of which the computer mechanism is governed by the meter.

As shown in the drawings, a reservoir 2, preferably an underground tank, is adapted to receive the gasoline or other liquid to be dispensed and from this tank the gasoline or other liquid is withdrawn through a pipe 4 having at its lower end the usual type of foot valve (not shown). The pipe 4 extends into the usual dispensing pump housing 6 from the bottom thereof and communicates with a pump 8 driven through a suitable system of gears and shafts by an electric motor 10 of the alternating current, single phase type, or any convenient type.

The dispensing line through which the liquid is forced by the pump 8 may comprise a pipe 12 for discharging the liquid into an air eliminator 14 by means of which the air is withdrawn from the liquid and the liquid is discharged under pressure into the pipe 16 which communicates with the inlet side of a meter 18 by means of which the volume of liquid passing through the line is measured and the shaft 20 of the meter driven in proportion to the amount of liquid flowing through the meter. The liquid is discharged from the meter 18 and through a pipe 21 which projects from the housing at the upper end thereof and which may be connected through a fitting 22 to a flexible dispensing hose 24. The fitting 22 may form part of a sight gauge 26 of any usual type. The flexible dispensing hose 24 carries at its free end a dispensing nozzle 28 containing the usual manually controlled dispensing valve 30, the nozzle being hung, when not in use, on a support 32 carried by the housing and, when so hung, preventing the manual operation of a switch lever 34 interconnected by a rod 36 to a crank 38 for operating a motor control switch 40, schematically indicated in Figure 2.

The meter shaft 20 extends into an explosion-proof switch housing 42 in which is mounted a cam disk 44 secured directly to the meter shaft or to a shaft suitably geared to the meter shaft. The meter shaft 20 also extends above the housing 42 and is connected to a price adjustable variator 46 which, since it carries no appreciable load, may be of very simple construction, preferably of the structure shown, although it may be of any suitable construction. As disclosed, a variator of the preferred construction comprises a friction wheel 48 secured to the upper end of the meter shaft 20 and interconnected by balls 50 to a friction roll 52, the balls 50 being mounted in a carrier 54 consisting of a rod slidably mounted in an appropriate mounting for adjustment radially of the friction wheel 48 and axially of the friction roll 52 so that by endwise adjustment of the rod, the points of contact of the balls with the wheel and roll may be displaced radially of the friction wheel so as to determine the speed ratio between the friction wheel 48 and the roll 52. The rod 54 may be formed at its outer end with ratchet teeth meshing with the teeth of a gear 56 rotationally adjustable by means of a worm 58 secured to an adjustment shaft 60 mounted in a suitable bracket fixed to the housing, or to the frame structure supporting the housing and positioned behind a locked panel 62 hinged and locked to the housing. The shaft 60 may be provided in any well-known manner with a rough adjusting knob 64 and a vernier adjusting knob 66. The shaft 60 is also interconnected by means of suitable sprockets of a chain drive 68 to a price indicating register 70 of the usual construction. The shaft 72 of the friction roll 52 of the price variator extends into an explosion-proof switch housing 74 in which is mounted a cam disk 76 secured to the end of the shaft.

A fluid actuated pressure switch 78, of any well-known construction, is connected in fluid communication with the pipe 21 of the dispensing line so that the contacts of the pressure switch, schematically indicated at 80 in Figure 2, are closed only when the fluid is flowing at relatively low pressure through the dispensing line, the dispensing hose, and the dispensing nozzle.

Volume and cost registers 82 and 84, respectively, may be mounted in any conventional manner in the housing adjacent the top portion thereof or remotely therefrom. The volume register 82 is driven by an electric motor 86, such as a single phase capacitor start, capacitor run motor, which is interconnected through a speed reducing gear box 88, which may accomplish a speed reduction on the order of nine to one, to a shaft 90 on which is mounted a cam disk 92. The shaft 90 is connected through a second speed reducing gear box 94, which may accomplish a speed reduction on the order of twenty to one, to the operating shaft 96 of the volume register 82. The cost register 84 is driven by an electric motor 98, of the same type as the motor 86, which drives a shaft 100 through a speed reducing gear box 102 which may accomplish a speed reduction on the order of two to one. The shaft 100 has secured to it a cam disk 104 and is also interconnected through a speed reducing gear box 106, which may accomplish a speed reduction on the order of twenty to one, to the operating shaft 108.

It will be evident, of course, that the speed reductions effected by the gear boxes 88, 94, 102 and 106 may be of any desired ratios dependent upon the speed ratings of the motors 86 and 98, and the type and kind of registers actuated by these motors. If the register 82 is of the type conventionally employed in computer pumps, the shaft 96 operates a tenths of a gallon indicating drum having numbers from zero to nine, and which drum is interconnected through transfer mechanism to a like unit drum in such manner so that as the tenths drum shifts from the number nine to zero, the units drum is advanced one step. In similar fashion, of course, the units drum operates, through transfer mechanism, the tenths drum. In such a register, the drums are reset after each dispenser transaction through a suitable hand crank in such manner that the drums are returned to their zero settings without causing a reverse operation of the register operating shaft 96. With such a register it is necessary or advisable that the tenths drum be not moved to each succeeding numeral until that precise amount in tenths of gallons has been dispensed, for accuracy within tenths of a gallon is desirable, if not required. However, accuracy within $5/100$ of a gallon is satisfactory and permissible. Since, as will be presently described, the cam 92, in effect, checks the position of the tenths drum periodically as the liquid is dispensed, it is satisfactory and advisable that the shaft 90 rotate twenty times as fast as the tenths drum, then the cam 92 can accomplish a check for each $5/100$ of a gallon of liquid dispensed and prevent movement of the tenths drum from number to number until each tenth of a gallon has passed through the dispensing line.

The cost register 84, as conventionally employed, is similar in every respect to the volume register 82 and, for the same reason, it is advisable that the cam 104 rotate twenty times as fast as the tenths drum of the cost register so that it may, in effect, check the position of the tenths drum for each one-half cent so that the cost register will not be advanced from cent to cent until more than half a cent's worth of gasoline has been dispensed.

The motors 86 and 98 each comprise, as previously stated, a conventional capacitor start, capacitor run motor having a first winding 110 connected across supply leads 112 and 114, as by wires 116 and 118. The second winding 120 is connected in series with a phase displacing capacitor 122 and across the first winding. The capacitor 122, as well understood, causes in the winding 120 a current such as to produce with the winding 110 a rotating field which effects rotation of the rotor of the motor. A motor of this type is well adapted for intermittent operation as its rotor comes quickly up to speed and quickly stops when voltage is applied to its terminals. Since it is the phase displacing action of the capacitor 122 which causes a motor of this type to run, the motor may be stopped by any means which causes an opposite phase displacement of the current in the winding 120 or of the current in the winding 110. The motor may be stopped by connecting to the common terminal of the winding 120 and capacitor 122 an inductive reactor 124 so connected as to cause an opposite phase displacement in the winding 120.

As shown, the reactor 124 of each motor is adapted to be connected in shunt with the capacitor 122 at certain times and, when so connected, the reactor causes the motor to stop by reducing or destroying the rotating field of the motor.

The shunt circuit for the reactor 124 of the motor 86 is completed through normally open switch contacts 126 and 128 periodically closed by cam disk 92, and normally closed switch contacts 130 and 132 periodically opened under the control of the cam disk 44 when the switch contacts 126 and 128 are closed. While the contacts 130 and 132 are closed, the reactor 124 is connected in shunt to the capacitor 122 on one side and the capacitor, through the reactor 124, wire 134, switch contacts 126 and 128, wire 136, switch contacts 132 and 130, wire 138, wire 140, supply lead 114 and wire 118 to the opposite side of the capacitor.

The reactor 124 of the motor 98 is similarly connected in shunt to its capacitor 122 through normally open switch contacts 142 and 144, periodically closed by cam disk 104 and normally closed switch contacts 146 and 148 periodically opened under the control of cam disk 76. Whenever switch contacts 142 and 144 are closed while the contacts 146 and 148 are also closed, the reactor 124 of the motor 98 is connected in shunt to the capacitor 122 from one side of the capacitor through the reactor, through wire 150, switch contacts 142 and 144, wire 152, switch contacts 146 and 148, wire 154, wire 140, supply lead 114 and wire 118 to the other side of said capacitor.

The supply lead 112 is connected to the supply line L—1 through the pressure switch 80 and the nozzle lever control switch 40 arranged in series, so that if either of these switches is open, the motors 86 and 98 are energized. The supply lead 114 is directly connected to the supply line L—2. The motor 10 is connected on one side to the supply lead 112 between the switches 42 and 80, and on the other side to the supply lead 114 so that the motor 10 will be energized whenever the switch 42 is closed and will be unaffected by the opening and closing of the pressure switch 80.

The pump 8 is of the conventional by-pass type in which the fluid is by-passed from the exhaust side of the pump to the intake side of the pump whenever the dispensing valve is closed while the motor 10 is energized.

The operation of the device is as follows: The operator or service station attendant or customer, as the case may be, first lifts the nozzle off the hook or support 32 and then operates the switch lever 34 to cause the closure of the switch 40. This effects the energization of the motor 10 which thereupon drives the pump 8 and the fluid is by-passed from the exhaust side to the intake side at a pressure which is relatively high in the dispensing line. The nozzle valve 30 being opened, the pump forces the gasoline first through the pipe 12, then the air eliminator 14, the pipe 16, meter 18, pipe 21 and the fitting 22, the dispensing hose 24, nozzle valve 30 and the nozzle 28. The instant that the valve 30 is opened, the pressure in the dispensing line drops to a relatively low value and the pressure actuated switch 78 closes the switch 80 so that the motors 86 and 98 are now energized and drive their respective shafts 90 and 100 to cause operation of the tenths drum of the volume register and the unit drum of the cost register.

The cam disk 44 is provided with a notch 156 which permits the switch contacts 130 and 132 to open once for each revolution of the cam disk. Similarly, the cam disk 76 has a notch 158 which permits the contacts 146 and 148 also to open once on each revolution of that cam disk. The cam disks 92 and 104 are provided with cam lugs 160 and 162, respectively, which cause the contacts 126 and 128, and the contacts 142 and 144 to close once on each revolution of their respective cam disks.

For purposes of description, let it be assumed that the speed of the motors 86 and 98, when allowed to rotate continuously, is 1800 R. P. M. and that by virtue of the speed reducers 88 and 102, the cams 92 and 104 operate, when driven continuously, at a speed of 200 R. P. M. and 900 R. P. M., respectively.

The closing of the switch 80 therefore, assuming that the cams 92 and 104 are stopped on termination of the previous dispensing transaction in the position shown in Figure 2, effects energization of the motor 86 and causes the cam 92 to rotate through a partial revolution until the switch contacts 126 and 128 are closed. If at the instant of closing of these contacts the cam disk 44 should be in such position that the notch 156 allows the switch contacts 130 and 132 to open, the motor 86 will remain energized and the cam 92 will continue rotation, at least through another revolution. If at the instant the contacts 126 and 128 are closed the notch 156 should be displaced from the switch contacts 130 and 132, the reactor 124 for the motor 86 will be connected across its associated capacitor 122 and the motor will stop. Until the notch 156 does arrive at the position at which it permits the contacts 130 and 132 to open, when the shunt circuit through the reactor will be broken and the motor will again start. The contacts 142 and 144 with their associated contacts 146 and 148 operate in a similar manner to control the starting and stopping of the motor 98.

Let it be further assumed that the computer is so designed as to compute the volume and cost of the gasoline at a maximum price of 45 cents per gallon and at a maximum rate of flow of ten gallons per minute. At this maximum rate of flow and maximum cost per unit of volume of liquid dispensed, the cam 92 will rotate continuously at the same speed of rotation as the cam 44. So long as the flow remains constant at the maximum volume, the lugs 160 will always arrive at the contacts 126 and 128 at the same time as the notch 156 arrives at its contacts 130 and 132. Hence the motor will rotate continuously to drive the tenths drum of the volume register at a speed of 100 R. P. M., as required to register ten gallons per minute. The variator 46 at this maximum cost setting will cause its cam 76 to be driven at the speed of 900 R. P. M. and, since the motor 98 when operated continuously drives the cam 104 at a speed of 900 R. P. M. under the assumed conditions, the motor 98 will rotate continuously to drive the units drum of the cost register at a speed of 45 R. P. M., as required to register the total cost of $4.50 for the ten gallons dispensed during each minute.

If by reason of partial closure of the nozzle valve, or for any other cause, the rate of flow of the liquid and consequently the speed of operation of the meter shaft 20 is reduced, the cam 92 will, as previously described, make one revolution, rotating the tenths drum of the volume register through $\frac{1}{20}$ of a revolution, or through $\frac{5}{100}$ of a gallon and then stop the motor 86 until the meter driven cam disk 44 has completed one revolution. Thus the motor 86, which has a fixed continuous speed of rotation, is caused to operate the volume register at a discontinuous speed determined by and governed in exact accordance with the speed of rotation of the meter shaft. On reduction in the rate of flow of the gasoline, as previously stated, the cam 76 slows down and consequently the cam 104 makes one complete revolution, rotating the tenths drum of the cost register through $\frac{1}{20}$ of a revolution, or $\frac{1}{2}$ cent, and then stops the motor until the cam 76 has completed one revolution. Thus, on each revolution of the cam disk 104, an additional $\frac{1}{2}$ cent will be registered in the cost register, but it will not be allowed to move to that additional half cent until the amount of gasoline dispensed has exceeded in volume the previously registered half cent, so that the cost register always indicates the amount of money which the service station owner is entitled legally to receive.

As the price of the gasoline per unit of volume is changed, the price variator 46 is adjusted to vary the speed of the cam 76 in accordance with the new price. For descriptive purposes, let it be assumed that the dispenser is designed to dispense gasoline at a price of five cents per gallon at the previously assumed rate of ten gallons per minute. As the price of the gasoline is changed, the operation of the volume register is not affected since the speed of operation of the cam 44 is fixed in relation to the speed of rotation of the meter shaft 20. Assuming the minimum price, however, the variator 46 is adjusted to cause the cam 76 to rotate at a minimum speed of 100 R. P. M. under the previously assumed conditions. The cam 104 being driven, when it is driven at all, at the assumed speed of 900 R. P. M., will make one revolution during the first 1/10 of a revolution of the cam disk 76. The motor 98 and the cam 104 will then remain stationary until the cam disk 76 has moved through its remaining 9/10 of a revolution. As soon as the cam 76 has completed one revolution, the motor is again started and the cam 104 operates through another revolution. This discontinuous speed of operation of the cam 104 will thus agree with the continuous speed of rotation of the cam 76 or exceed that by a maximum of one revolution. Since the cam disk 76 operates under the assumed conditions at 100 R. P. M., the shaft 100 will be operated 100 or 101 R. P. M., but it will not make the extra revolution until the cam disk 76 has started on its 101st revolution, during which revolution, of course, gasoline is being dispensed. If the dispensing operation is terminated at the time the cam 104 has completed its 101st revolution and the cam 76 is going through its 101st revolution, the actual registration of cost may exceed the value of the liquid actually dispensed, depending upon the extent of the uncompleted revolution of the cam 76 but in no event can this excess registration be greater than 1/2 cent and the lower order numeral of the cost drum will still be exposed through the register window and will govern the price to be paid as it does with prior equipment under similar conditions when the dispensing is terminated with the drum partially advanced from one unit to the next.

In the present type of computer the operator or the customer must estimate the degree to which the drum has rotated to adjacent numbers in order to determine whether the customer is entitled to pay the lower amount or the attendant is entitled to the higher amount. With the present device, both the customer and the attendant will know that the customer is entitled to pay the lower amount until the higher numeral appears in full registration with the register window and thus there is no need to estimate the degree of movement of the units between two adjacent penny figures.

Thus it will be clear that regardless of the rate at which the gasoline is dispensed, the volume and cost registration will be governed by the dispensing rate and the price per unit of volume of gasoline dispensed, even though the registers are driven independently by separate electric motor means.

The motors 86 and 98 are of relatively inexpensive construction since they are never required to carry a heavy load nor operate continuously. The switches may likewise be of inexpensive construction since they are not required to carry a heavy or appreciable current.

It will be apparent from the foregoing description that applicant has provided a liquid dispensing apparatus for dispensing fuels and the like, including electric motor means for computing and indicating the volume and cost of the liquid dispensed, which is relatively simple in construction, inexpensive in cost, efficient in operation, and which may be easily adjusted to effect any necessary price change. Applicant has further provided a computer which may be operated without mechanical connection to the liquid forcing and measuring elements and which, therefore, may be located either remote from or adjacent to said elements.

Obviously the invention is not limited to the specific details of construction disclosed herein but is capable of other modifications and changes without departing from the spirit and scope of the appended claims.

I claim:

1. In a liquid dispensing apparatus, a liquid dispensing line, registering means, a capacitor start, capacitor run electric motor for driving said registering means and having a phase changing device operable to render it ineffective to drive the registering means, a meter in said dispensing line for measuring the liquid flowing through said line, and motor control means including means driven by said motor and means electrically interconnected therewith and driven by the meter for controlling said phase changing device to render the motor ineffective to drive the registering means when the movement of the registering means exceeds by a predetermined fraction of a unit the movement of the meter and to render the motor again effective to drive the register when the meter in its movement catches up with the movement of the registering means.

2. In a liquid dispensing apparatus, a dispensing line, cost registering means, a rotary electric motor having its shaft connected to said registering means to drive the latter, means actuated by said motor for stopping the motor after each predetermined number of revolutions of its shaft, a meter in said dispensing line for measuring the flow of liquid through said line, means governed by the movement of the meter for starting said motor to advance the cost registering means in accordance with the flow of liquid through the meter, said governing means including price calibrated adjustment means for adjustably predetermining said motor starting movement of the meter.

3. In a liquid dispensing apparatus, a dispensing line, cost registering means, a rotary electric motor having its shaft connected to said cost registering means to drive the latter, means actuated by said motor for stopping the motor after each predetermined number of revolutions of its shaft, a meter in said dispensing line for measuring the liquid flowing through said line, and means actuated by each predetermined movement of the meter for starting said motor whereby to advance the cost registering means in accordance with the predetermined measurement of liquid by said meter, said motor starting means including calibrated adjustment means for predetermining the starting of said motor.

4. In a liquid dispensing apparatus the combination comprising a flow meter, a register for indicating a factor proportional to the flow through said meter, an electric motor for driving said register, control means for rendering said motor intermittently operative to drive said register including a switch intermittently operated by said motor and another cooperating switch intermittently operated by said meter, and means for varying the speed at which said latter switch is operated to control selectively the proportion between said flow meter and the factors indicated by said register.

5. In a liquid dispensing apparatus having a meter for measuring the liquid flowing therethrough, a capacitor-start-capacitor-run electric motor, an inductive reactor operable when energized to stop said motor, a register driven by said motor for progressively indicating the cost of the liquid dispensed through said meter, a pair of control switches for controlling the energization and de-energization of said reactor, means driven by said motor for actuating one of said switches for each unit of cost registration, means driven by said meter for actuating the other one of said switches once for each unit amount of liquid dispensed corresponding to said unit of cost registration, and means for varying the speed of operation of the last mentioned switch in accordance with the price per unit of volume of liquid dispensed to vary the on and off period of the motor in accordance with the price per unit of volume of liquid dispensed.

6. In a liquid dispensing apparatus having a liquid flow meter, cost registering means, a constant speed electric motor for driving said register, and an electric control for said motor including switch means operated by the motor, means adjustable as to speed and driven by the meter, and switch means operated by said adjustable speed means for periodically checking the operations of said registering means against the operations of the meter in a ratio predetermined by said adjustable means to maintain the operation of the register means proportionate to the price per unit of volume of liquid flowing therethrough.

7. In a liquid dispensing apparatus a meter for measuring liquid flowing therethrough, a register for indicating the total cost of liquid passed through said meter, an electric motor for driving said register, and a control circuit for controlling the starting and stopping of said motor including a pair of switches, means driven by the meter for actuating one of said switches to start said motor, said switch being actuated once for each predetermined amount of liquid passed by said meter corresponding to the unit of cost registration, means for varying the speed of operation of said switch in accordance with the price per unit volume of liquid, and means driven by said motor for actuating the other one of said switches to stop said motor, said motor driven means having a speed of operation higher than the highest speed of operation of said meter actuated switch.

8. In a liquid dispensing apparatus the combination comprising a flow meter, a register for indicating a factor selectively proportional to the flow through said meter, an electric motor for driving said register, control means for rendering said motor intermittently operative to drive said register including a switch intermittently operated by said motor and another switch intermittently operated by said meter, means for varying the speed at which said latter switch is operated to control the proportion between said flow meter and the factor indicated by said register, and means responsive to the starting and stopping of flow through said meter for rendering effective and ineffective respectively said electric motor.

9. In a liquid dispensing apparatus, a meter for measuring liquid flow, cost registering means, constant speed electric motor means for driving said registering means, first switch means periodically operated at a constant rate by said motor means and second switch means cooperating with the first switch means and periodically operated by said meter for controlling starting and stopping of said motor to check the advance of the registering means with the operation of said meter, and means for varying the rate at which the second switch is periodically operated by the meter in accordance with the price unit volume of liquid dispensed.

CURTIS F. PRANGLEY.

REFERENCES CITED

The following references are of record in the file of this patent:

UNITED STATES PATENTS

| Number | Name | Date |
| --- | --- | --- |
| 649,006 | Steinmetz | May 8, 1900 |
| 1,974,857 | Winton | Sept. 25, 1934 |
| 2,060,674 | Hicks | Nov. 10, 1936 |
| 2,137,133 | Dallman | Nov. 15, 1938 |
| 2,137,524 | Bugg | Nov. 22, 1938 |
| 2,151,239 | Slye et al. | Mar. 21, 1939 |
| 2,203,789 | Johnson | June 11, 1940 |
| 2,203,790 | Johnson | June 11, 1940 |
| 2,319,444 | Crosby | May 18, 1943 |

FOREIGN PATENTS

| Number | Country | Date |
| --- | --- | --- |
| 114,749 | Australia | Mar. 5, 1942 |